(12) United States Patent
Scholte-Wassink et al.

(10) Patent No.: US 8,022,565 B2
(45) Date of Patent: Sep. 20, 2011

(54) METHOD AND APPARATUS FOR CONTROLLING A WIND TURBINE

(75) Inventors: Hartmut Scholte-Wassink, Lage (DE); Mark Edward Cardinal, Altamont, NY (US); Anthony Michael Klodowski, Hardy, VA (US); Till Hoffmann, Osnabrueck (DE); Jignesh G. Gandhi, Simpsonville, SC (US); Sidney Allen Barker, Troutville, VA (US); Gert Torbohm, Rheine (DE); Christoph Schulten, Salzbergen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/618,171

(22) Filed: Nov. 13, 2009

(65) Prior Publication Data

US 2010/0133831 A1  Jun. 3, 2010

(51) Int. Cl.
*F03D 7/00* (2006.01)
*F03D 9/00* (2006.01)

(52) U.S. Cl. .......................................... 290/44; 290/55
(58) Field of Classification Search .................... 290/44, 290/43, 55, 54; 322/44, 89
See application file for complete search history.

(56) References Cited

U.S. PATENT DOCUMENTS

| | | | |
|---|---|---|---|
| 4,703,189 A | 10/1987 | DiValentine et al. | |
| 6,600,240 B2 | 7/2003 | Mikhail et al. | |
| 6,619,918 B1 | 9/2003 | Rebsdorf | |
| 6,703,718 B2 | 3/2004 | Calley et al. | |
| 6,840,734 B2 | 1/2005 | Hansen | |
| 6,847,128 B2 | 1/2005 | Mikhail et al. | |
| 7,023,105 B2 | 4/2006 | Wobben | |
| 7,411,309 B2* | 8/2008 | Hudson | 290/44 |
| 7,476,987 B2* | 1/2009 | Chang | 290/55 |
| 2005/0046375 A1* | 3/2005 | Maslov et al. | 318/650 |
| 2006/0112688 A1 | 6/2006 | Vos et al. | |
| 2006/0273595 A1* | 12/2006 | Avagliano et al. | 290/44 |
| 2007/0018457 A1 | 1/2007 | Llorente | |
| 2007/0278797 A1* | 12/2007 | Flannery et al. | 290/44 |
| 2009/0008937 A1 | 1/2009 | Erdman et al. | |
| 2009/0079193 A1 | 3/2009 | Nielsen et al. | |
| 2009/0083019 A1* | 3/2009 | Nasle | 703/18 |
| 2009/0174186 A1* | 7/2009 | Nyborg | 290/44 |
| 2010/0072751 A1* | 3/2010 | Andersen et al. | 290/44 |
| 2010/0138182 A1* | 6/2010 | Jammu et al. | 702/113 |
| 2010/0268395 A1* | 10/2010 | Ingemann et al. | 700/289 |
| 2010/0271994 A1* | 10/2010 | Wolfe | 370/311 |
| 2011/0006603 A1* | 1/2011 | Robinson et al. | 307/31 |

FOREIGN PATENT DOCUMENTS

EP  1939445  2/2008

OTHER PUBLICATIONS

EPO Search Report received in EP 10190087 dated Mar. 17, 2011.

* cited by examiner

*Primary Examiner* — Michael C Zarroli
(74) *Attorney, Agent, or Firm* — James McGinness, Esq.; Armstrong Teasdale LLP

(57) ABSTRACT

A control system for a wind turbine, the control system having at least one measurement device configured to measure at least one operating condition of the wind turbine and a first controller. The first controller is configured to calculate an operating limit of the wind turbine based on the measured operating condition and to adjust the operating limit based on a limiting condition of a component of the wind turbine.

20 Claims, 4 Drawing Sheets

METHOD AND APPARATUS FOR CONTROLLING A WIND TURBINE

BACKGROUND OF THE INVENTION

The subject matter described herein relates generally to wind turbines and, more particularly, to a method and apparatus for controlling a wind turbine.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with pre-defined rated power limits. To operate within such rated power limits, the electrical and/or mechanical components may be operated with large margins for the operating limitations. Such operation may result in inefficient wind turbine operation, and a power generation capability of the wind turbine may be underutilized.

BRIEF DESCRIPTION OF THE INVENTION

In one embodiment, a control system for a wind turbine is provided that includes at least one measurement device configured to measure at least one operating condition of the wind turbine and a first controller. The first controller is configured to calculate an operating limit of the wind turbine based on the measured operating condition and to adjust the operating limit based on a limiting condition of a component of the wind turbine.

In another embodiment, a wind turbine is provided that includes a generator, a rotor configured to rotatably drive the generator, and a control system that includes at least one measurement device configured to measure at least one operating condition of the wind turbine and a first controller. The first controller is configured to calculate an operating limit of the wind turbine based on the measured operating condition, to adjust the operating limit based on a limiting condition of a component of the wind turbine, and to adjust an operating condition of at least one of the generator and the rotor based on the operating limit.

In yet another embodiment, a method for controlling a wind turbine is provided that includes measuring at least one operating condition of a wind turbine, calculating an operating limit of the wind turbine based on the measured operating condition, adjusting the operating limit based on a limiting condition of a component of the wind turbine, and adjusting an operating condition of at least one of a generator and a rotor based on the operating limit.

DETAILED DESCRIPTION OF THE INVENTION

The embodiments described herein facilitate capturing additional power from a wind turbine through more efficient operation of one or more components of the wind turbine. One or more measurement devices measure an operating condition of one or more mechanical component and/or one or more electrical component. A first controller calculates a mechanical power limit from a measured environmental condition. A second controller compares an operating condition of a plurality of electrical components with a limit condition for each component. The second controller determines which electrical component is capable of producing and/or receiving the least amount of power, and the second controller sets an electrical power limit to a limit value of the electrical component with the least power capability. The first controller calculates a difference between the mechanical power limit and the electrical power limit, and calculates a turbine power limit and/or a turbine speed limit from the calculated difference. The wind turbine adjusts a power generation and/or a rotational speed of the wind turbine based on the calculated turbine power limit and/or the calculated turbine speed limit.

Figure 1:
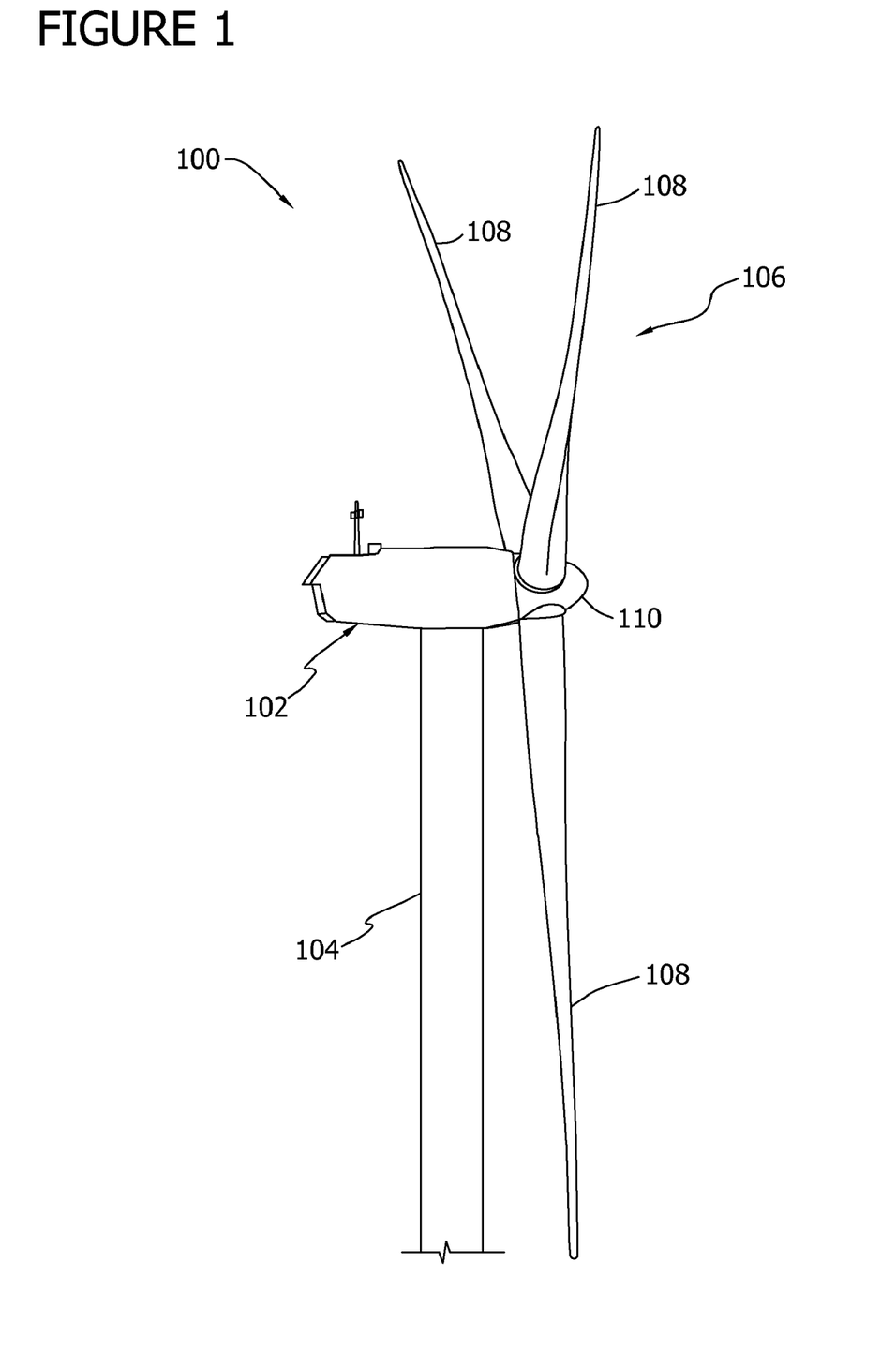
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
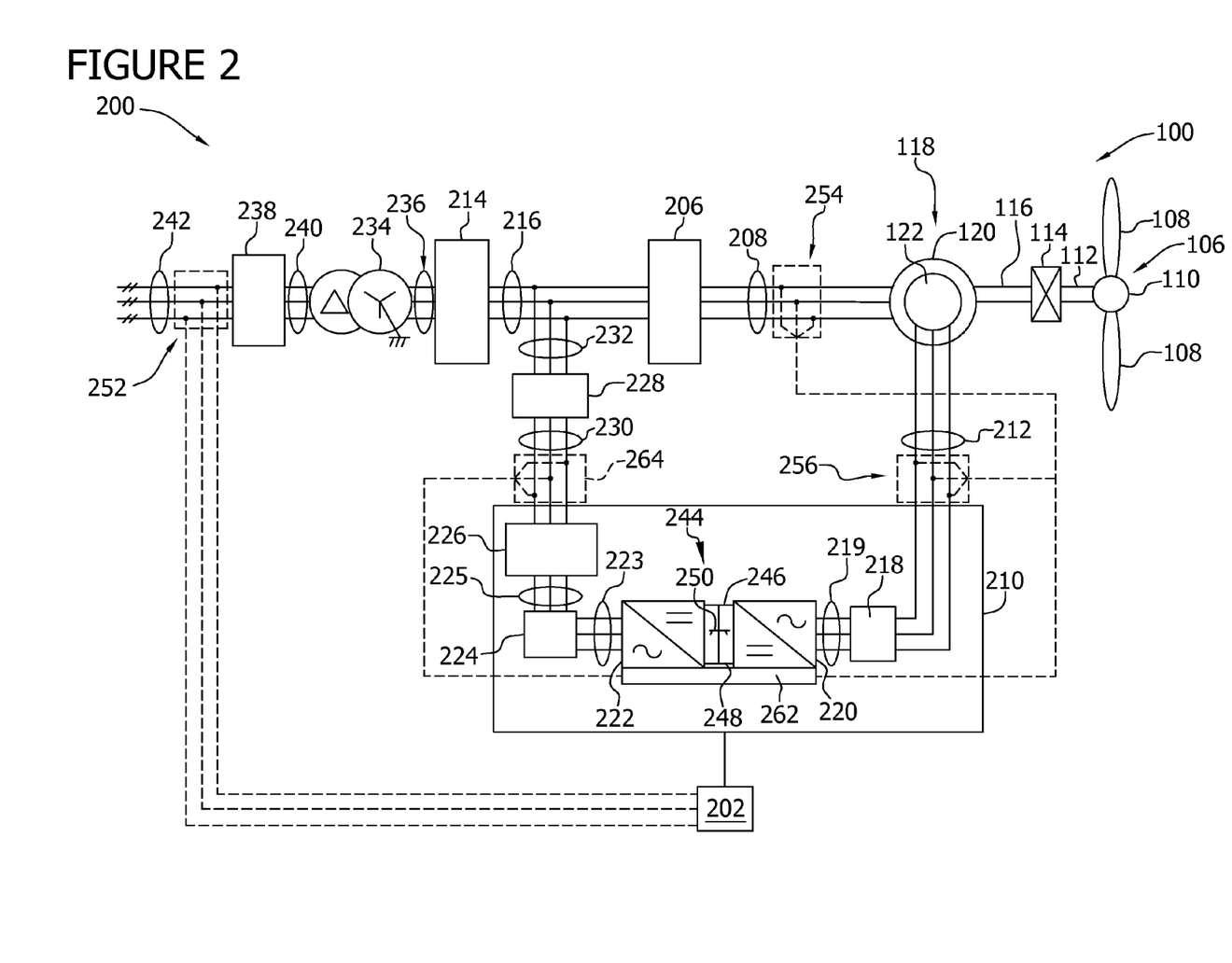
FIG. 2 is a schematic view of an exemplary electrical and control system suitable for use with the wind turbine shown in FIG. 1.

FIG. 2 is a schematic view of an exemplary electrical and control system 200 that may be used with wind turbine 100.

Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
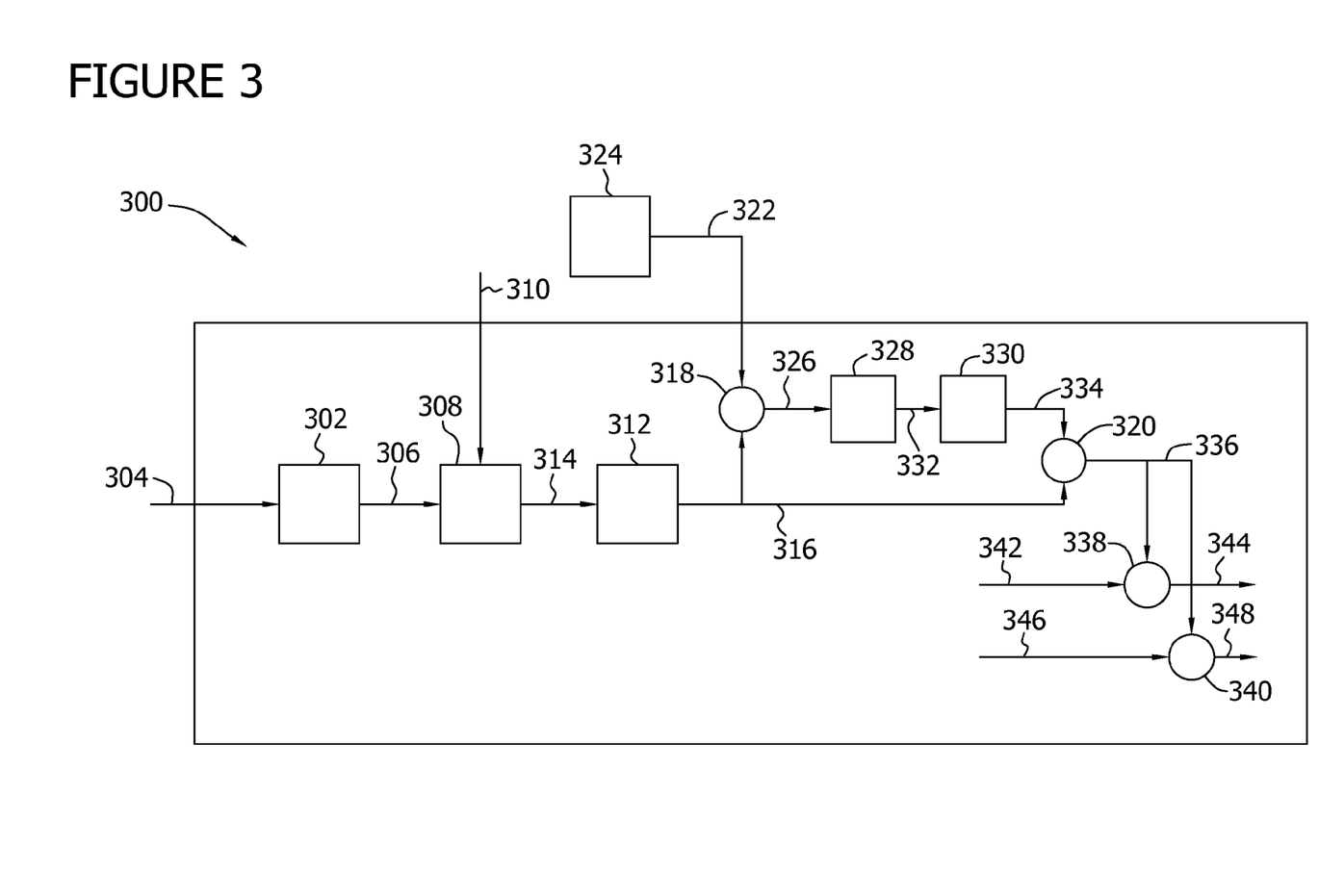
FIG. 3 is a block diagram of an exemplary power limit control system suitable for use with the electrical and control system shown in FIG. 2.

FIG. 3 is a schematic view of an exemplary power limit control system 300 suitable for use with electrical and control system 200 (shown in FIG. 2). Power limit control system 300 calculates a power limit (also known as a power setpoint) and/or a rotational speed limit (also known as a speed setpoint) for wind turbine 100 (shown in FIG. 1). As used herein, the term "limit" refers to a maximum steady state value for an associated operating condition of one or more components of wind turbine 100. It should be noted that an operating condition may exceed a defined limit for short durations and may be greater than a rated limit of wind turbine 100 and/or of one or more components of wind turbine 100. In the exemplary embodiment, power limit control system 300 is at least partially implemented by a first controller, such as turbine controller 202 (shown in FIG. 2). Alternatively, power limit control system 300 is implemented by any suitable controller and/or control system.

In the exemplary embodiment, power limit control system 300 includes a mechanical limit calculator 302 that receives one or more measured environmental conditions 304. In the exemplary embodiment, measured environmental condition 304 can be any of a measured air density, a measured altitude, a measured wind speed, a measured ambient temperature, and/or any suitable measured environmental condition at or near wind turbine 100. Mechanical limit calculator 302 uses measured environmental condition 304 to calculate a maximum power limit at which one or more mechanical components of wind turbine 100 may operate with a level of fatigue that is predefined as acceptable (hereinafter referred to as a "mechanical power limit"). In one embodiment, mechanical limit calculator 302 references a look-up table to correlate the measured air density, or another measured environmental condition 304, to the mechanical power limit. Alternatively, mechanical limit calculator 302 uses a predefined equation, or any suitable method, to calculate the mechanical power limit. In one embodiment, mechanical limit calculator 302 compares measured environmental condition 304 to one or more limit conditions of one or more mechanical components. In such embodiment, mechanical limit calculator 302 compares the limit conditions of the mechanical components and sets a calculated mechanical power limit value 306 to the most limited condition (i.e., the lowest value of a difference between a limit condition and corresponding measured environmental condition 304). In other words, mechanical limit calculator 302 calculates a maximum power limit of one or more mechanical components, and sets calculated mechanical power limit value 306 to the maximum power level at which all mechanical components may operate. The maximum power limit may be greater than a rated power limit of wind turbine 100. Mechanical limit calculator 302 transmits calculated mechanical power limit value 306 to a power limit selector 308. As used herein, calculated mechanical power limit value 306 is a signal representing a mechanical power limit, and the signal is transmitted through one or more conductors within power limit control system 300. One skilled in the art will recognize that, as used herein, a "value" transmitted from one component to another is transmitted in a signal, and the signal includes a component that represents the value.

Power limit selector 308 receives a dynamic power limit enable signal 310 from turbine controller 202 or from any suitable component of wind turbine 100. Dynamic power limit enable signal 310 indicates whether wind turbine 100 is configured to dynamically change the mechanical power limit, or whether wind turbine 100 must use a default power limit value. More specifically, if wind turbine 100 is configured to dynamically change the power limit (i.e., if dynamic power limit enable signal 310 is set to a "true" value or another suitable value), power limit selector 308 transmits the calculated mechanical power limit value 306 to a first filter 312. Alternatively, if wind turbine 100 is not configured to dynamically change the power limit (i.e., if dynamic power limit enable signal 310 is set to a "false" value or other suitable value), power limit selector 308 transmits the default power limit value to first filter 312. In the exemplary embodiment, the default power limit value corresponds to a rated power limit of wind turbine 100. After selecting either calculated mechanical power limit value 306 or the default power limit value, power limit selector 308 transmits a selected power limit value 314 to first filter 312.

First filter 312 facilitates determining a steady state mechanical power limit for power limit control system 300. In the exemplary embodiment, first filter 312 includes a low pass filter with a time constant of about 20 seconds. Alternatively, first filter 312 may be any suitable filter and may have any suitable time constant. First filter 312 facilitates filtering out rapid fluctuations of selected power limit value 314. As such, first filter 312 facilitates reducing an effect of transient operating conditions of the mechanical components of wind turbine 100, including, without limitation, a rapid change in a speed of rotor 106 (shown in FIG. 1) due to wind gusts. First filter 312 transmits a mechanical power limit value 316 to a first summing junction 318 and to a second summing junction 320.

First summing junction 318 receives a converter power limit value 322 that is transmitted from a converter limit calculator 324 (explained in greater detail hereinafter with respect to FIG. 4). First summing junction 318 subtracts converter power limit value 322 from mechanical power limit value 316, and transmits a resulting power limit difference 326 to a limit function 328. Power limit difference 326 represents an amount of power reduction required due to constraints within power conversion assembly 210 (shown in FIG. 2). In other words, power limit difference 326 represents a reduction in mechanical power limit value 316 to preserve sufficient operating margins for power conversion assembly 210. In one embodiment, power conversion assembly 210 preserves sufficient operating margins of one or more components of power conversion assembly 210 to operate with voltage fluctuations of between about 0% and about 5%, reactive power fluctuations of between about 5% and about 20%, and torque variations of between about 0% and about 5%, and all included subranges. In another embodiment, power conversion assembly 210 preserves sufficient operating margins of one or more components of power conversion assembly 210 to operate with voltage fluctuations of about 2%, reactive power fluctuations of about 10%, and torque variations of about 2%. Alternatively, power conversion assembly 210 may be configured to maintain other suitable margins as desired. Power conversion assembly 210 and/or components within power conversion assembly 210 may be less constrained than the mechanical components of wind turbine 100. In such situation, converter power limit value 322 will be greater than mechanical power limit value 316, resulting in a negative value for power limit difference 326.

Limit function 328 forces power limit difference 326 to a non-negative value. If power limit difference 326 has a negative value, limit function 328 outputs a substantially zero value to a second filter 330. If power limit difference 326 has a value that is greater than or equal to zero, limit function 328 outputs the value of power limit difference 326 to second filter 330. As such, limit function 328 prevents converter power limit value 322 from increasing the power limit of wind turbine 100 above a limit that the mechanical components are equipped to handle (i.e., above mechanical power limit value 316). Limit function 328 transmits an adjusted power limit 332 to second filter 330.

Second filter 330 facilitates determining a steady state power limit reduction required by power conversion assembly 210. In the exemplary embodiment, second filter 330 includes a low pass filter with a time constant of about 4 seconds. Alternatively, second filter 330 may be any suitable filter and may have any suitable time constant. Second filter 330 facilitates filtering out rapid fluctuations of adjusted power limit 332. As such, second filter 330 facilitates reducing an effect of transient operating conditions of the electrical components of wind turbine 100, including, without limitation, a rapid increase of a voltage, a current, and/or a frequency within power conversion assembly 210. Second filter 330 transmits a mechanical power reduction value 334 to second summing junction 320. Mechanical power reduction value 334 represents an amount of power that mechanical power limit value 316 needs to be reduced by as a result of constraints within power conversion assembly 210.

Second summing junction 320 subtracts mechanical power reduction value 334 from mechanical power limit value 316 and transmits a resulting net power adjustment value 336 to a first multiplier 338 and a second multiplier 340. First multiplier 338 receives a speed reference value 342 and multiplies speed reference value 342 by net power adjustment value 336 to obtain a turbine speed limit 344. Second multiplier 340 receives a power reference value 346 and multiplies power reference value 346 by net power adjustment value 336 to obtain a turbine power limit 348. In the exemplary embodiment, wind turbine 100 and/or turbine controller 202 adjust a power output of generator 118, a torque of generator 118, and/or a rotational speed of rotor 106 (shown in FIG. 1) based on turbine speed limit 344 and/or turbine power limit 348.

Figure 4:
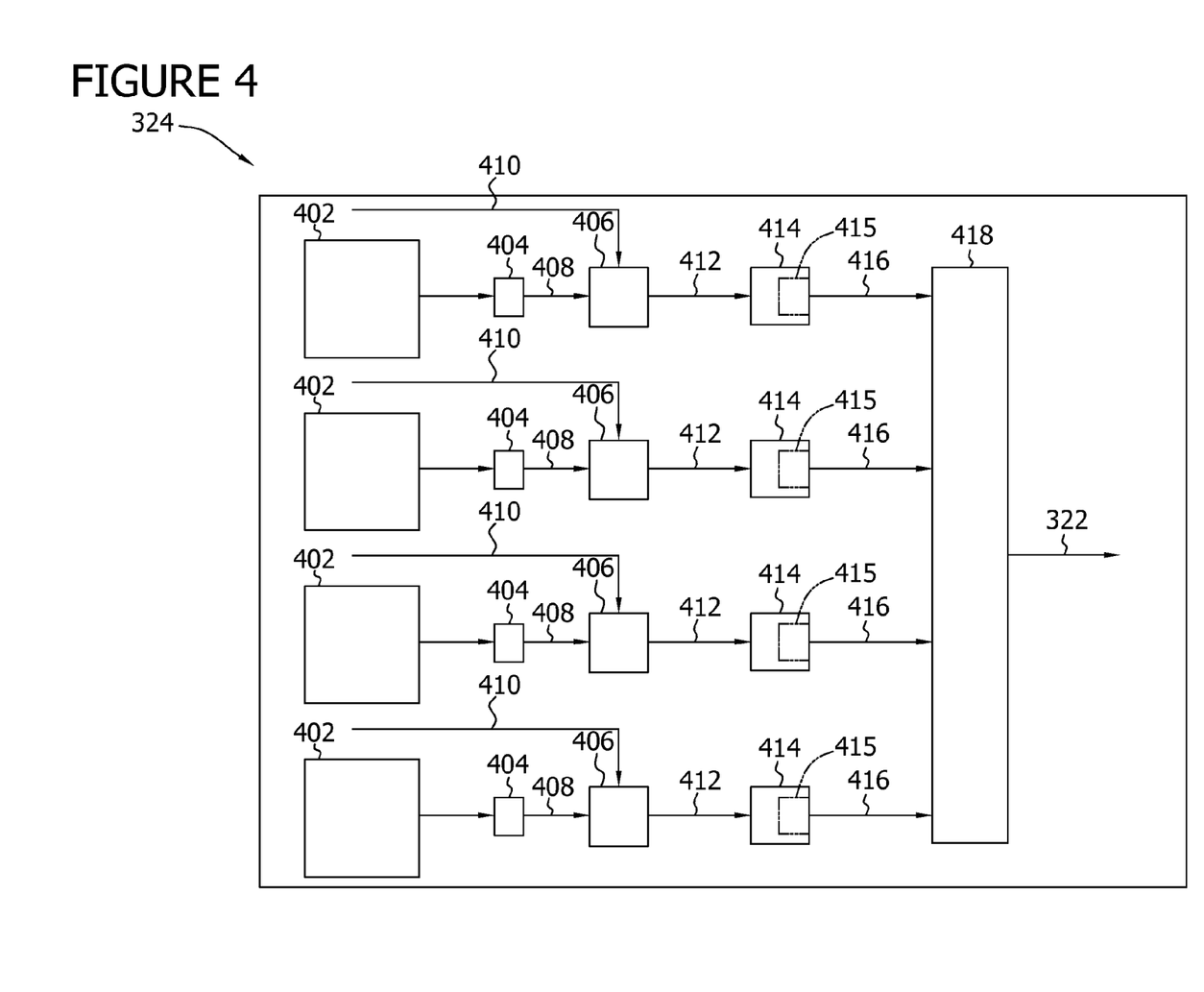
FIG. 4 is a block diagram of an exemplary converter limit calculator suitable for use with the power limit control system shown in FIG. 3.

FIG. 4 is a block diagram showing an exemplary converter limit calculator 324 suitable for use with power limit control system 300 (shown in FIG. 3). In the exemplary embodiment, converter limit calculator 324 is implemented by a second controller, such as converter controller 262 (shown in FIG. 2). Alternatively, converter limit calculator 324 is within power limit control system 300 and/or is implemented by turbine controller 202 (shown in FIG. 2) or any suitable controller and/or control system. Converter limit calculator 324 includes a plurality of components 402 of wind turbine 100 (shown in FIG. 1). In the exemplary embodiment, components 402 are electrical components within power conversion assembly 210 and/or wind turbine 100. Alternatively, components 402 are electro-mechanical components, mechanical components, and/or any suitable components of power conversion assembly 210 and/or wind turbine 100. While FIG. 4 shows converter limit calculator 324 including four components 402, converter limit calculator 324 may include any number of components 402. In one embodiment, components 402 include, without limitation, gearbox 114, rotor-side power converter 220, line-side power converter 222, generator stator 120, generator rotor 122 (all shown in FIG. 2), and/or any suitable component. In the exemplary embodiment, each component 402 within converter limit calculator 324 is communicatively coupled to at least one measurement device 404 that measures one or more operating conditions of component 402. In one embodiment, measurement devices 404 include one or more sensors that may include, for example, one or more of the following: first set of voltage and electric current sensors 252, second set of voltage and electric current sensors 254, third set of voltage and electric current sensors 256, fourth set of voltage and electric current sensors 264 (all shown in FIG. 2), and any suitable sensor. Alternatively, measurement devices 404 include or are replaced by turbine controller 202, converter controller 262, and/or any suitable device or model that may provide one or more measurements and/or calculated values of an operating condition of component 402.

In the exemplary embodiment, each measurement device 404 is communicatively coupled to a summing junction 406. Each measurement device 404 transmits to summing junction 406 one or more component values 408 representing one or more measured or calculated operating conditions of component 402. Such operating conditions may include, without limitation, a current, a voltage, a power, and/or a temperature at or within component 402. Summing junction 406 receives one or more component limit values 410 representing one or more maximum operating limits for each component 402. Such limit values may include, without limitation, a maximum steady state or instantaneous current, voltage, power, and/or temperature within which component 402 is configured to operate. In the exemplary embodiment, component limit values 410 are predetermined or predefined operating constraints that are set during installation of components 402, during wind turbine 100 commissioning, and/or during a wind farm (not shown) commissioning. Component limit values 410 are stored within a memory (not shown) of turbine controller 202, converter controller 262, and/or any other suitable device. Alternatively, component limit values 410 are set during any suitable time, and/or are dynamically set such that component limit values 410 may be changed during operation of wind turbine 100. Component limit values 410 are transmitted to summing junction 406 from turbine controller 202, from converter controller 262, and/or from any suitable device. In one embodiment, component limit values 410 are transmitted to summing junction 406 from a wind farm controller (not shown).

Summing junction 406 subtracts component value 408 from component limit value 410 and outputs a difference value 412 representing the result of the comparison. In one embodiment, difference value 412 is configured to represent a difference between component value 408 and component limit value 410. In another embodiment, difference value 412 is configured to represent a substantially 0 value if component value 408 is less than or equal to component limit value 410, and a difference between component value 408 and component limit value 410 if component value 408 is greater than component limit value 410. Alternatively, summing junction 406 outputs difference value 412 that represents any suitable expression of the result of the comparison. In the exemplary embodiment, each difference value 412 represents an amount that each operating condition of each component 402 is above or below each respective limit value of each component limit value 410. More specifically, each difference value 412 represents an amount of power above or below the respective limit value that each component 402 is capable of producing and/or receiving.

In the exemplary embodiment, difference value 412 is transmitted to a gain module 414 that multiplies difference value 412 by a gain value. In one embodiment, gain module 414 includes or is operatively coupled to an integration module 415 that facilitates reducing an error, such as a tracking error of one or more components of converter limit calculator 324. Alternatively, gain module 414 includes any suitable compensation function that operates on difference value 412. In the exemplary embodiment, each difference value 412 is multiplied by a separate gain value, and the gain values are selected to substantially normalize each difference value 412 to facilitate a comparison between difference values 412. The gain values are predetermined or predefined and are set during installation of components 402, during wind turbine 100 commissioning, and/or during a wind farm (not shown) commissioning. The gain values are stored within a memory (not shown) of turbine controller 202, converter controller 262, and/or any other suitable device. Alternatively, the gain values are set during any suitable time, and/or are dynamically set such that the gain values may be changed during operation of wind turbine 100. Gain module 414 applies the gain value to difference value 412 and transmits a resulting normalized limit value 416 to a limit comparison module 418. In the exemplary embodiment, each normalized limit value 416 represents a normalized amount of power that each component is capable of producing and/or receiving.

Limit comparison module 418 receives each normalized limit value 416 and compares normalized limit values 416 with each other. In the exemplary embodiment, limit comparison module 418 determines which normalized limit value 416 contains the smallest value, and sets converter power limit value 322 to the value of the smallest normalized limit value 416. Limit comparison module 418 transmits converter power limit value 322 to power limit control system 300. In other words, limit comparison module 418 determines which component 402 has the lowest power capability and sets converter power limit value 322 to a value representing the lowest power capability. Power limit control system 300 reduces an operating limit, such as mechanical power limit value 316, turbine speed limit 344, and/or turbine power limit 348 (shown in FIG. 3) based on converter power limit value 322.

The embodiments described herein calculate a maximum power limit for one or more mechanical components of wind turbine 100, and reduce the maximum power limit based on a limit or a constraint of one or more electrical components of wind turbine 100 and/or power conversion assembly 210. However, one or more steps of the calculation may be reversed, such that a maximum power limit for one or more electrical components may be calculated, and the maximum power limit may be reduced by a limit or a constraint of one or more mechanical components.

A technical effect of the systems and method described herein includes at least one of: (a) measuring at least one operating condition of the wind turbine; (b) calculating an operating limit of a wind turbine based on a measured operating condition; (c) adjusting an operating limit based on a limiting condition of a component of a wind turbine; and (d) adjusting an operating condition of at least one of a generator and a rotor based on an operating limit.

The above-described embodiments facilitate providing an efficient and cost-effective control system for a wind turbine. The power limit control system calculates an operating limit, such as a power limit, of a plurality of wind turbine components, and sets an overall turbine power limit to a value that is substantially equal to the power limit of the component with the least power capability. The power limit control system may increase a wind turbine power output to a level that is greater than a rated power level of the wind turbine, while facilitating maintaining each wind turbine component within predefined operating limits. As such, additional power may be captured using the power limit control system.

Exemplary embodiments of a wind turbine, a control system for a wind turbine, and methods of controlling a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a wind turbine, said control system comprising:
   at least one measurement device configured to measure at least one operating condition of the wind turbine; and, a first controller configured to:
calculate an operating limit of the wind turbine based on the measured operating condition;
identify a component of a plurality of components of the wind turbine having a lowest power capability; and,
adjust the operating limit based on a limiting operating condition of the identified component.

2. A control system in accordance with claim 1, wherein said first controller is configured to calculate an operating limit that includes a power limit of the wind turbine that is greater than a rated power limit of the wind turbine.

3. A control system in accordance with claim 1, wherein said first controller is further configured to reduce the operating limit based on a limiting condition of a plurality of electrical components of the wind turbine.

4. A control system in accordance with claim 3, further comprising a second controller configured to:
determine an electrical component of the plurality of electrical components having a lowest power capability; and,
cause the operating limit to be reduced based on the electrical component having the lowest power capability.

5. A control system in accordance with claim 4, wherein the power capability of each electrical component is normalized before the lowest power capability is determined.

6. A control system in accordance with claim 1, wherein said first controller is further configured to:
calculate a power limit based on a maximum power capability of a plurality of mechanical components of the wind turbine; and,
reduce the power limit based on a limiting condition of a plurality of electrical components of the wind turbine.

7. A control system in accordance with claim 1, further comprising a filter configured to reduce a fluctuation of the operating limit.

8. A wind turbine, comprising:
a generator;
a rotor configured to rotatably drive said generator;
a control system comprising:
at least one measurement device configured to measure at least one operating condition of said wind turbine; and,
a first controller configured to:
calculate an operating limit of said wind turbine based on the measured operating condition;
identify a component of a plurality of components of said wind turbine having a lowest power capability;
adjust the operating limit based on a limiting operating condition of said identified component; and,
adjust an operating condition of at least one of said generator and said rotor based on the operating limit.

9. A wind turbine in accordance with claim 8, wherein said first controller is configured to calculate an operating limit that includes a power limit of said wind turbine that is greater than a rated power limit of said wind turbine.

10. A wind turbine in accordance with claim 8, wherein said first controller is further configured to reduce the operating limit based on a limiting condition of a plurality of electrical components of said wind turbine.

11. A wind turbine in accordance with claim 10, further comprising a second controller configured to:
determine an electrical component of said plurality of electrical components having a lowest power capability; and,
cause the operating limit to be reduced based on said electrical component having the lowest power capability.

12. A wind turbine in accordance with claim 11, wherein the power capability of each electrical component of said plurality of electrical components is normalized before the lowest power capability is determined.

13. A wind turbine in accordance with claim 8, wherein said first controller is further configured to:
calculate a power limit based on a maximum power capability of a plurality of mechanical components of said wind turbine; and,
reduce the power limit based on a limiting condition of a plurality of electrical components of said wind turbine.

14. A wind turbine in accordance with claim 8, further comprising a filter configured to reduce a fluctuation of the operating limit.

15. A method for controlling a wind turbine, said method comprising:
measuring at least one operating condition of the wind turbine;
calculating an operating limit of the wind turbine based on the measured operating condition;
identifying a component of a plurality of components of the wind turbine having a lowest power capability;
adjusting the operating limit based on a limiting operating condition of the identified component; and,
adjusting an operating condition of at least one of a generator and a rotor based on the operating limit.

16. A method in accordance with claim 15, further comprising reducing the operating limit based on a limiting condition of a plurality of electrical components of the wind turbine.

17. A method in accordance with claim 16, further comprising:
determining an electrical component of the plurality of electrical components having a minimum power capability; and,
reducing the operating limit based on the electrical component having the minimum power capability.

18. A method in accordance with claim 17, wherein the power capability of each electrical component of the plurality of electrical components is normalized before a minimum power capability is determined.

19. A method in accordance with claim 15, further comprising:
calculating a power limit based on a maximum power capability of a plurality of mechanical components of the wind turbine; and,
reducing the power limit based on a limiting condition of a plurality of electrical components of the wind turbine.

20. A method in accordance with claim 15, further comprising filtering the operating limit to reduce a fluctuation of the operating limit.

* * * * *